PHASE CONTROL NETWORK FOR A STEREOPHONIC SYSTEM

Filed July 14, 1964 3 Sheets-Sheet 1

INVENTOR.
CHARLES E. DIXON

BY Marvin Moody

ATTORNEY

Nov. 1, 1966 C. E. DIXON 3,283,079

PHASE CONTROL NETWORK FOR A STEREOPHONIC SYSTEM

Filed July 14, 1964 3 Sheets-Sheet 2

INVENTOR.
CHARLES E. DIXON

BY [signature]

ATTORNEY

INVENTOR.
CHARLES E. DIXON
BY
ATTORNEY 3,283,079
Patented Nov. 1, 1966

3,283,079

PHASE CONTROL NETWORK FOR A STEREOPHONIC SYSTEM

Charles E. Dixon, Cedar Rapids, Iowa, assignor to Collins Radio Company, Cedar Rapids, Iowa, a corporation of Iowa Filed July 14, 1964, Ser. No. 382,610
10 Claims. (Cl. 179—15)

This invention relates to a phase control network and more particularly to a phase control network for a stereophonic system wherein a pilot signal is transmitted along with a harmonically related signal centered at a superaudio frequency.

A broadcasting system capable of approaching the reproduction of sound exactly as it would be heard directly from the point of origination has been under study for some years. While many systems have been proposed, including the use of dual channels to carry the necessary intelligence information, the system utilizing a single channel carrying a multiplex composite signal has gained acceptance of late, and it is this type of system that has been adopted by the Federal Communications Commission as the standard for frequency modulation (FM) broadcasting in the United States.

The multiplex composite output signal now utilized for stereophonic FM broacasting includes the sum of the left and right audio input signals ($L+R$) at audio frequencies, the difference between the left and right audio input signals ($L-R$) centered at a superaudio frequency of 38 kilocycles, and a pilot signal at a frequency of 19 kilocycles. The transmission and reception of stereophonic information on a single wideband channel necessarily involves synchronous modulation (in the transmitter) and demodulation (in the receiver). This synchronization is accomplished by transmission of the pilot signal at a low level along with the intelligence signal. Exact modulation and demodulation can occur only if the transmitter sends the pilot signal in the correct frequency and phase relationship with respect to the frequency of the superaudio frequency generator utilized to develop the $L-R$ signal and the receiver generates a superaudio signal at the proper frequency and phase for demodulation purposes. Failure to achieve synchronization results in distortion and loss of channel separation at the receiver output.

It is therefore an object of this invention to provide a phase control network for a stereophonic system capable of eliminating phase deviation between the transmitted pilot signal and the output frequency from superaudio frequency generating means used for modulation and demodulation purposes in the stereo transmitter and receiver, respectively.

It is another object of this invention to provide a phase control network for a stereophonic system that automatically adjusts the phase of either the pilot signal from the pilot signal generating means or the superaudio signal from the superaudio frequency generating means to thereby avoid distortion and loss of channel separation at the receiver of said stereophonic system.

It is yet another object of this invention to provide a phase control network for controlling the relative phases of two harmonically related signals, which network includes sampling means for receiving both of said signals and providing two sampling outputs each of which includes a different portion of one of said harmonically related signals, rectifying means connected to each said sampling output, and a voltage comparator for comparing the resulting voltages developed by said rectifying means to develop an error signal that can be coupled to one of the generators producing said harmonically related signals.

With these and other objects in view which will become apparent to one skilled in the art as the description proceeds, this invention resides in a novel construction, combination and arrangement of parts substantially as hereinafter described and more particularly defined by the appended claims, it being understood such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
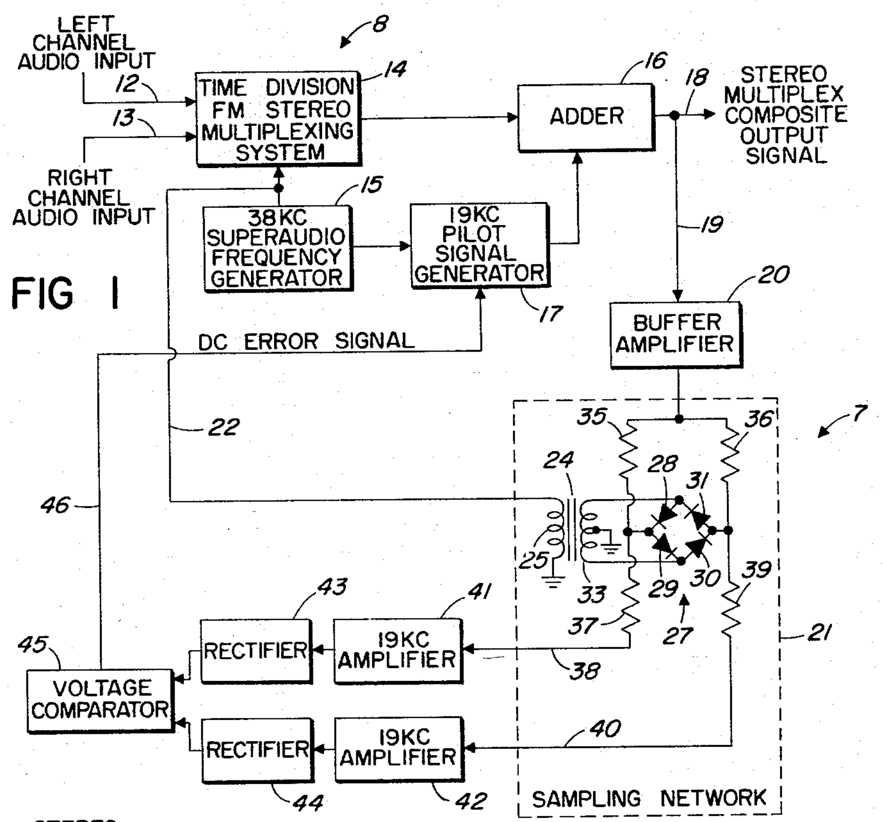
FIGURE 1 is a schematic and block diagram of the phase control network of this invention shown connected to an FM stereophonic transmitter.
Figure 2:
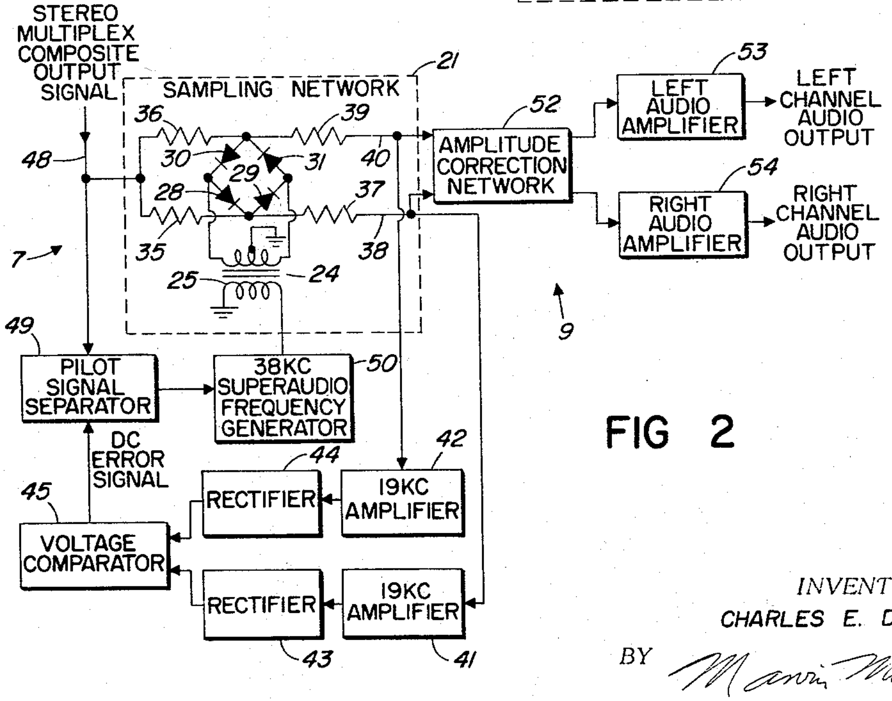
FIGURE 2 is a schematic and block diagram of the phase control network of this invention shown connected to an FM stereophonic receiver.

Referring now to the drawings in which like numerals have been used for like characters throughout, the numeral 7 refers generally to the phase control network of this invention, which network may be connected either to transmitter circuitry 8 (as shown in FIGURE 1) or to receiver circuitry 9 (as shown in FIGURE 2). As shown in FIGURE 1, the left channel audio input signals and the right channel audio input signals [which may be conventionally developed as by means of microphones (not shown), for example], are coupled by means of leads 12 and 13, respectively, to time division FM stereo multiplexing system 14. System 14 may, for example, be a stereo modulator of the type shown in United States Patent No. 3,136,860, issued June 9, 1964, to Robert J. Hirvela and Frank D. McLin and assiged to the assignee of the present invention.

As shown in FIGURE 1, time division FM stereo multiplexing system 14 also receives a superaudio signal at a frequency of 38 kilocycles (kc.) from superaudio frequency generator 15. The superaudio signal from generator 15 is used to modulate the difference signal ($L-R$) as is well known in the art. Time division FM stereo multiplexing system 14 produces a composite output signal that includes the sum of the left and right audio signals ($L+R$) at audio frequencies and a signal equal to the difference between the left and right audio signals ($L-R$), and it is the latter that is used to modulate the 38 kc. superaudio signal.

The composite output signal from system 14 is coupled to an adder 16 where the pilot signal is added to the composite signal. As shown in FIGURE 1, the pilot signal is generated by pilot signal generator 17, and since the pilot signal is harmonically related to the superaudio signal, it may be developed therefrom, as by means of a frequency divider, for example. In addition, of course, the 19 kc. signal could be generated independently, as by an oscillator and the output therefrom could be doubled in frequency to produce the superaudio signal at a frequency of 38 kilocycles.

The composite output signal from adder 16 is coupled to the remainder of the transmitter circuitry (not shown) by means of lead 18. Although not shown the remainder of the transmitter circuitry could include, for example, the circuitry shown in United States Patent No. 3,137,816 issued June 16, 1964, to Frank D. McLin and Glenn W. Sellers and assigned to the assignee of the present invention.

The output from adder 16 is also coupled by means of lead 19 and buffer amplifier 20 to sampling network 21 of the phase control network 7 of this invention. In addition, the output from 38 kilocycle subcarrier (or superaudio frequency) generator 15 is likewise coupled to sampling network 21 by means of lead 22.

Sampling network 21 includes a transformer 24 having a primary winding 25 one end of which is grounded and the other end of which is connected to lead 22. Sampling network 21 also includes a diode bridge 27 that includes form diodes 28, 29, 30 and 31. As shown in FIGURE 1, all of these diodes have each pole connected to an unlike pole of the adjacent diode. In addition, the junction of diodes 28 and 31 is connected to one side of secondary winding 33 of transformer 24, while the junction of diodes 29 and 30 is connected to the opposite side of winding 33 of transformer 24. Secondary winding 24 is center tapped and the center tap is connected to ground, as shown in FIGURE 1.

The output from buffer amplifier 20 is coupled through resistor 35 to the junction of diodes 28 and 29 and through resistor 36 to the junction of diodes 30 and 31. Two outputs are taken from the sampling network. One of these outputs is taken from the junction of diodes 28 and 29 through resistor 37 to sampling output lead 38, while the other output is taken from the junction of diodes 30 and 31 through resistor 39 to sampling output lead 40. Sampling output lead 38 is, in turn, connected to 19 kilocycle amplifier 41, while sampling output lead 40 is connected to 19 kilocycle amplifier 42. Amplifiers 41 and 42 are tuned to pass only the 19 kc. components.

The output from amplifier 41 is coupled to rectifier 43 and the output from amplifier 42 is coupled to rectifier 44. A voltage comparator 45 is connected to rectifiers 43 and 44 to receive the outputs from the rectifiers and develop a difference output therefrom. This difference output, or error signal, has a magnitude dependent upon the phase relationship between the pilot signal and the superaudio signal.

The output from voltage comparator 45 is coupled by means of lead 46 to the 19 kc. pilot signal generator to adjust the phase thereof, if needed, to maintain the desired phase relationship between the pilot signal and the superaudio signal from generator 15.

The phase control network of this invention may likewise be utilized in the FM receiver to maintain proper phase relationships between the 38 kilocycle subcarrier generator (superaudio frequency generator) used for demodulation and the 19 kc. pilot signal (which is part of the received composite signal from the transmitter).

As shown in FIGURE 2, the stereo multiplex composite input signal is coupled by means of lead 48 to sampling network 21 and to a pilot signal separator 49. Pilot signal separator 49 could be a filter, for example, tuned to 19 kilocycles to separate the pilot signal from the remainder of the composite signal. The 19 kc. signal coupled from pilot signal separator 49 is doubled in frequency in superaudio frequency generator 50 to generate the necessary 38 kilocycle signal for demodulation purposes.

As shown in FIGURE 2, the output from 38 kilocycle superaudio frequency generator 50 is coupled to the input winding 25 of transformer 24 in sampling network 21 in the same manner as described hereinabove with respect to the sampling network in the FM transmitter (shown in FIGURE 1). In like manner, the composite signal is coupled to sampling network 21 through resistors

35 and 36. In addition, the outputs taken from sampling network 21 are coupled through sampling output leads 38 and 40 in the same manner as described hereinabove with respect to the transmitter.

As shown in FIGURE 2, sampling outputs 38 and 40 are coupled through conventional amplitude correction network 52 and left and right amplifiers 53 and 54, respectively, to the left audio output channel and right audio output channel, respectively.

Sampling output leads 38 and 40 are coupled through 19 kc. amplifiers 41 and 42, respectively, to rectifiers 43 and 44, respectively. The output from each rectifier is then coupled to voltage comparator 45, where an error signal is developed if the pilot and superaudio signals are not in phase. In the receiver, the error signal is not coupled to the pilot signal generator (as it is in the transmitter), but instead is coupled to pilot signal separator 49 to adjust the phase of the superaudio signal from generator 50. This could be done, for example, by means of a voltage sensitive capacitor (Varicap) in the filter used as separator 49.

Figure 3:
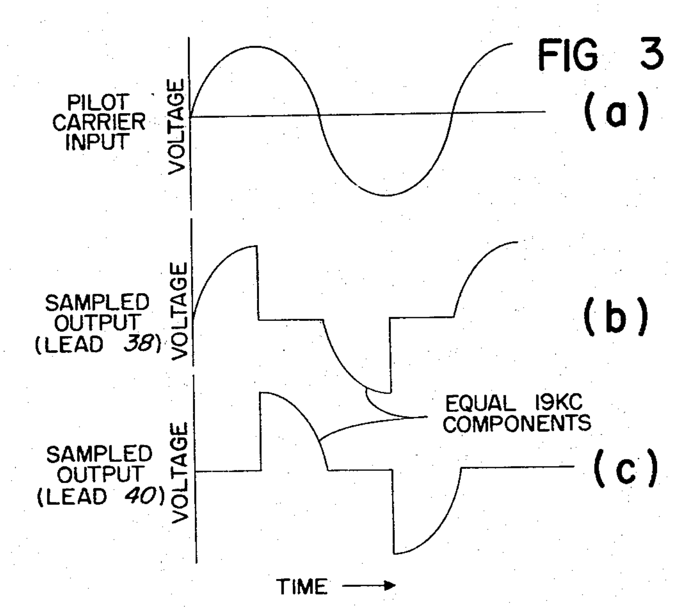
FIGURE 3 is a series of waveforms illustrating typically how the phase control network of this invention operates when the pilot and superaudio signals are in the proper phase relationship.

In operation, sampling network 21 receives the composite signal (either from adder 16 in the transmitter or through lead 48 in the receiver) along with the output from the superaudio frequency generator (generator 15 in the transmitter or generator 50 in the receiver). If the pilot signal is properly phased with respect to the superaudio signal, that is, if the two harmonically related signals cross the zero axis in synchronism, no error signal is developed. This condition is shown in FIGURE 3($a$) where the pilot signal crosses the zero axis at the same time as the 38 kilocycle superaudio signal (zero time being assumed as the time axis of crossing of the 38 kilocycle signal), the latter being used to chop the pilot signal into sampled portions as shown in FIGURES 3($b$) and 3($c$). As shown in FIGURES 3 ($b$)and 3($c$), the sampled output on lead 38 has 19 kc. components equal to the sampled output components on lead 40, thus producing a zero error output from comparator 45. Since the 38 kc. signal is twice that of the 19 kc. pilot signal, every other one-fourth cycle (one-half of each alternation) appears at the sampled output, and, of course, due to diode biasing by the 38 kc. signal, the portion of the pilot signal appearing at lead 38 is different from that appearing at lead 40.

Figure 4:
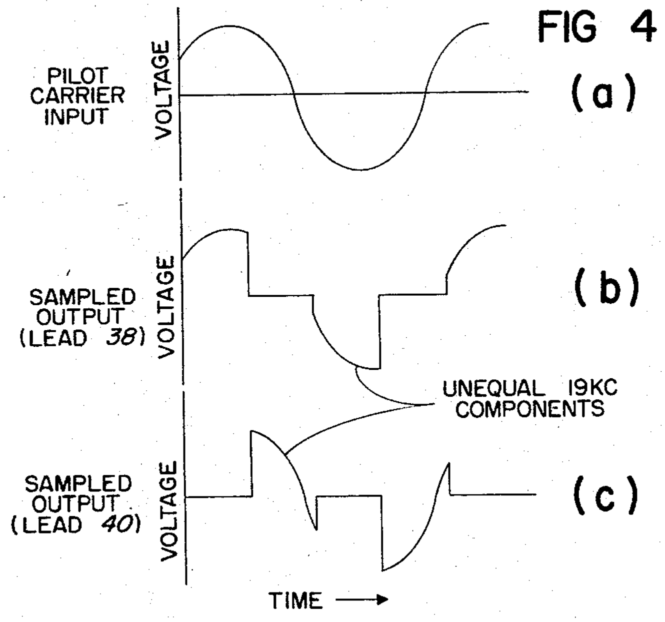
FIGURE 4 is a series of waveforms illustrating typically how the phase control network of this invention develops an error signal when the pilot and superaudio signals are slightly out of phase.

If the pilot signal is not in the proper phase relationship relative to the 38 kilocycle superaudio signal, then the pilot signal will not cross the zero axis at the same time as does the 38 kc. signal from the superaudio frequency generator, as is shown in FIGURE 4($a$) (again assuming zero time as the time of axis crossing of the 38 kc. signal). The sampled output on lead 38 is therefore unlike the sampled output on lead 40 and an error signal is developed by voltage comparator 45, which signal when coupled to one of the generators will change the phase thereof to be automatically adjusted to eliminate the deviation. The application of audio modulation does not upset the established relationships because the pilot carrier is the only 19 kilocycle output component present in the sampled output after the outputs are coupled through the 19 kilocycle amplifiers.

Fourier analysis of the sampled outputs show that they contain equal amplitude 19 kilocycle components only when the phasing of the pilot signal, relative to the superaudio signal, is correct. Incorrect phasing results in one sampled output having a greater 19 kc. component than the other sampled output, as shown in FIGURES 4($b$) and 4($c$). The network is able to correct the phase deviation regardless of direction since phase lag or phase lead is determined by the relative magnitude of two sampled outputs.

Figure 5:
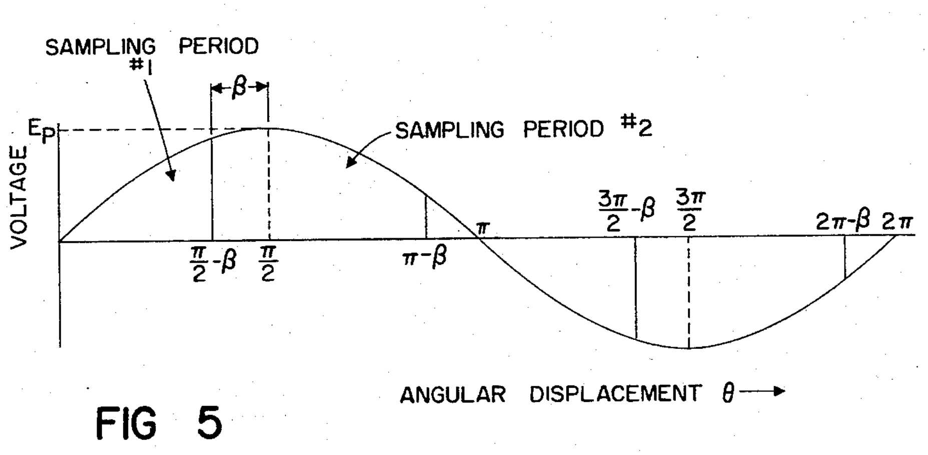
FIGURE 5 is a typical waveform for illustrating Fourier analysis of the sampled outputs of the network of this invention.

Using the typical waveform shown in FIGURE 5, a mathematical analysis of the sampled outputs from the network of this invention follows.

Considering:

$A$=peak value of fundamental, sine component $B$=peak value of fundamental, cosine component $\beta$=angular phase deviation between sampled outputs By definition:

$$A_1=\frac{1}{\pi}\int_0^{2\pi} e \sin \theta d\theta \quad (1)$$

$$B_1=\frac{1}{\pi}\int_0^{2\pi} e \cos \theta d\theta \quad (2)$$

Then the output for sampling period 1 is:

$$A_1=\frac{E_p}{\pi}\int_0^{\frac{\pi}{2}-\beta} \sin\theta \sin\theta d\theta+\frac{E_p}{\pi}\int_{\pi-\beta}^{\frac{3\pi}{2}-\beta} \sin\theta \sin\theta d\theta+\frac{E_p}{\pi}\int_{2\pi-\beta}^{2\pi} \sin\theta \sin\theta d\theta \quad (3)$$

which integrates to:

$$A_1=E_p\left(\frac{1}{2}-\frac{\sin 2\beta}{\pi}\right) \quad (4)$$

$$B_1=\frac{E_p}{\pi}\int_0^{\frac{\pi}{2}-\beta} \sin\theta \cos\theta d\theta+\frac{E_p}{\pi}\int_{\pi-\beta}^{\frac{3\pi}{2}-\beta} \sin\theta \cos\theta d\theta+\frac{E_p}{\pi}\int_{2\pi-\beta}^{2\pi} \sin\theta \cos\theta d\theta \quad (5)$$

which integrates to:

$$B_1=E_p\frac{\cos 2\beta}{\pi} \quad (6)$$

since:

$C_1$=peak amplitude of fundamental component=

$$\sqrt{A_1^2+B_1^2} \quad (7)$$

$$C_1=E_p\sqrt{\frac{1}{4}+\frac{1}{\pi^2}-\frac{\sin 2\beta}{\pi}} \quad (8)$$

The output for sampling period 2 is $$A_1=\frac{E_p}{\pi}\int_{\frac{\pi}{2}-\beta}^{\pi-\beta} \sin\theta \sin\theta d\theta+\frac{E_p}{\pi}\int_{\frac{3\pi}{2}-\beta}^{2\pi-\beta} \sin\theta \sin\theta d\theta \quad (9)$$

which integrates to:

$$A_1=E_p\left(\frac{1}{2}+\frac{\sin 2\beta}{\pi}\right) \quad (10)$$

$$B_1=\frac{E_p}{\pi}\int_{\frac{\pi}{2}-\beta}^{\pi-\beta} \sin\theta \cos\theta d\theta+\frac{E_p}{\pi}\int_{\frac{3\pi}{2}-\beta}^{2\pi-\beta} \sin\theta \cos\theta d\theta \quad (11)$$

which integrates to:

$$B_1=E_p\left(\frac{-\cos 2\beta}{\pi}\right) \quad (12)$$

utilizing (7):

$$C_1=E_p\sqrt{\frac{1}{4}+\frac{1}{\pi^2}+\frac{\sin 2\beta}{\pi}} \quad (13)$$

Figure 6:
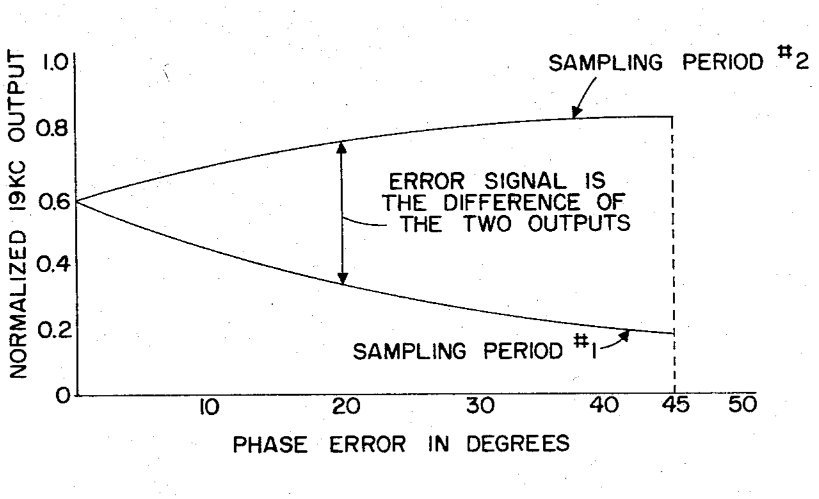
FIGURE 6 is a graph illustrating how the error signal of increasing magnitude is produced by the comparator of this invention as phase deviation increases.

A plot of the peak value of the fundamental 19 kc. output components for the two sampling periods (see FIGURE 6) shows that one output increases while the other decreases as the phase error is increased.

While the phase control network of this invention has been described in connection with a 19 kilocycle pilot signal and a 38 kilocycle superaudio signal, it is to be realized that this invention is not meant to be limited to a system utilizing these frequencies, since any two harmonically related frequency signals could be likewise utilized without departing from the intended scope of the invention.

From the foregoing, it should be evident to one skilled in the art that the phase control network of this invention provides a hereto unavailable means for precisely controlling the phase of a signal relative to another signal that is harmonically related, and that the phase control network of this invention is particularly well suited to maintain the proper phase relationships between the pilot signal and the superaudio signal used for modulation and demodulation of the difference signal in a stereophonic system.

What is claimed as my invention is:

1. A phase control network for a stereophonic system wherein a pilot signal is transmitted along with a harmonically related signal centered at a superaudio frequency, said network comprising: superaudio frequency generating means producing a superaudio signal at a predetermined frequency; pilot signal generating means producing a pilot signal at a predetermined frequency that is harmonically related to said predetermined superaudio signal frequency; sampling means including a diode bridge and a transformer, said transformer being connected to opposite junctions of said diode bridge, said sampling means receiving said superaudio and pilot signals and producing a first output signal that includes a portion of said pilot signal and a second output signal that includes a different portion of said pilot signal; said first and second output signals being taken from the other opposite functions of said diode bridge; first and second rectifying means receiving said first and second output signals, respectively, from said sampling means; and a voltage comparator connected to said rectifying means and producing an error signal the magnitude of which is determined by the difference between said first and second output signals, said error signal controlling the phase of one of said generating means to thereby automatically and precisely control the phasing between said superaudio and pilot signals.

2. A phase control network for a stereophonic system wherein a pilot signal is transmitted along with a harmonically related signal centered at a superaudio frequency, said network comprising: superaudio frequency generating means producing a superaudio signal at a predetermined frequency; pilot generating means producing a second signal at a predetermined frequency one-half that of said predetermined superaudio signal frequency; a transformer having an input winding and an output winding, said input winding being connected to said superaudio frequency generating means to receive said superaudio signal therefrom, and said output winding of said transformer having a center tap connected to ground; a diode bridge comprising first, second, third and fourth diodes each pole of which is connected to an opposite pole of each adjacent diode; input means coupling said pilot signal to the junction of said first and second diodes and to the junction of said third and fourth diodes; means connecting one side of said output winding of said transformer to the junction of said first and third diodes; means connecting the other side of said output winding of said transformer to the junction of said second and fourth diodes; first output means connected to the junction of said first and second diodes and producing a first output signal that includes one-half of each alteration of said pilot signal; second output means connected to the junction of said third and fourth diodes and producing a second output that includes the other half of each alternation of said pilot signal; first and second amplifiers connected to said first and second output means, respectively, said amplifiers being tuned to the same frequency as is said pilot signal; first and second rectifying means connected to said first and second amplifiers, respectively; a voltage comparator connected to receive the outputs from said first and second rectifying means, said voltage comparator producing an error signal determined by the difference between the outputs from said rectifying means; and means for coupling said error signal to one of said generating means to thereby automatically and precisely control the phasing between said pilot and superaudio signals.

3. The phase control network of claim 2 wherein said phase control network is in the transmitter of said stereophonic system and wherein said error signal is coupled to said pilot signal generating means.

4. The phase control network of claim 2 wherein said network is connected to the receiver of said stereophonic system and wherein said error signal is used to control said superaudio frequency generating means in said receiver.

5. An automatic phase control system, comprising: first signal generating means producing a first output signal; second signal generating means producing a second output signal the frequency of which is harmonically related to that of said first output signal; sampling means including a diode bridge and a transformer, said transformer being connected to opposite junctions of said diode bridge, said sampling network receiving said first and second output signals, said network having first and second sampling outputs taken from the other opposite junctions of said diode bridge and producing at each said sampling output a portion of said first output signal, the portion of said first output signal produced at said first sampling output being different from that produced at said second sampling output; first and second rectifying means connected to said first and second sampling outputs, respectively; a voltage comparator connected to said first and second rectifying means and producing an error signal the magnitude and sense of which is dependent upon the phase relationship between said first and second output signals; and means for coupling said error signal to one of said signal generating means whereby the output signal therefrom is accurately controlled in phase with respect to the output signal from the other said generating means.

6. The automatic phase control system of claim 5 wherein said sampling network includes a transformer connected to receive said second output signal and a diode bridge connected to said transformer and also receiving said first output signal.

7. The automatic phase control system of claim 5 wherein the frequency of said second output generated by said second generating means is one half that of said first output signal produced by the said first signal generating means.

8. The automatic phase control system of claim 5 wherein said means for coupling is connected to said first signal generating means.

9. The automatic phase control system of claim 5 wherein said means for coupling is connected to said second generating means.

10. A phase detector, comprising: a first generator producing a first output signal at a frequency f; a second generator producing a second output signal at a frequency nf; sampling means including a diode bridge and a transformer connected thereto; means connecting said second output signal to said transformer; means connecting said first output signal to said diode bridge, said diode bridge having first and second outputs each of which includes a different half of each alternation of said first output signal; first and second tuned means connected to said first and second sampling outputs, respectively, said tuned means being tuned to said frequency f; first and second rectifying means connected to said first and second tuned means, respectively; and a voltage comparator connected to said rectifying means and producing an error signal the magnitude and sense of which is dependent upon the relative phase deviations of said first and second output signals from said first and second generators.

References Cited by the Examiner

UNITED STATES PATENTS

| | | | |
|---|---|---|---|
| 3,031,529 | 4/1962 | Colodny | 179—15 |
| 3,040,132 | 6/1962 | Wilhelm | 179—15 |
| 3,209,270 | 9/1965 | De Vries | 179—15 |

OTHER REFERENCES

"Automatic Phase Lock for Stereo Multiplex Detector," RCA Technical Notes, No. 575, March 1964. Copies available in the Scientific Library. Call No. TK 6554.R2t.

DAVID G. REDINBAUGH, *Primary Examiner.*

ROBERT L. GRIFFIN, *Examiner.*

UNITED STATES PATENT OFFICE

CERTIFICATE OF CORRECTION

Patent No. 3,283,079 November 1, 1966

Charles E. Dixon

It is hereby certified that error appears in the above numbered patent requiring correction and that the said Letters Patent should read as corrected below.

Column 6, line 61, for "alteration" read -- alternation --.

Signed and sealed this 5th day of September 1967.

(SEAL)
Attest:

ERNEST W. SWIDER
Attesting Officer

EDWARD J. BRENNER
Commissioner of Patents